Jan. 13, 1948.   C. B. SHEPPARD   2,434,334
HIGH-FREQUENCY PULSE MEASURING SYSTEM
Filed July 5, 1946
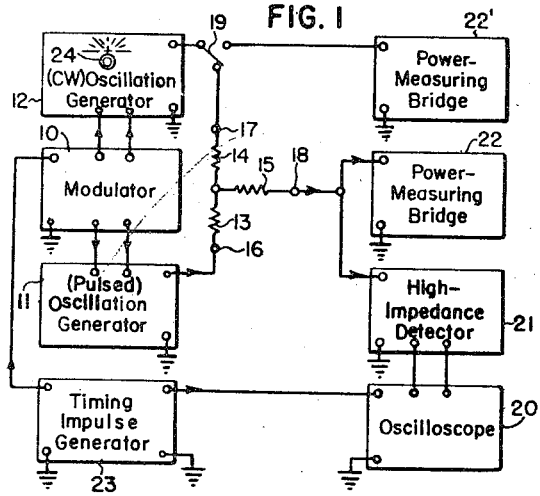
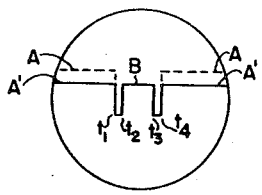
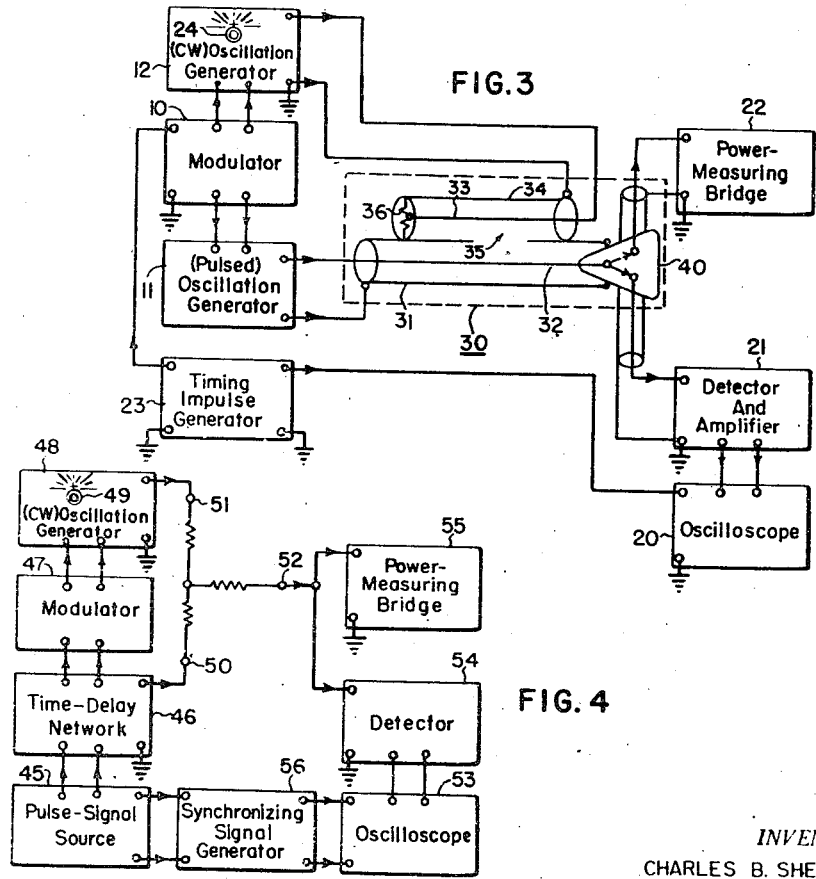
INVENTOR,
CHARLES B. SHEPPARD,
BY
ATTORNEY.

Patented Jan. 13, 1948

2,434,334

UNITED STATES PATENT OFFICE 2,434,334

HIGH-FREQUENCY PULSE MEASURING SYSTEM

Charles B. Sheppard, Cheltenham, Pa., assignor to Hazeltine Research, Inc., Chicago, Ill., a corporation of Illinois Application July 5, 1946, Serial No. 681,608

11 Claims. (Cl. 171—95)

This invention relates, in general, to methods of and electrical systems for making measurements of recurring pulses of high frequency energy. It is especially directed to pulse power-measuring systems and will be particularly described in that connection.

Instruments for making power measurements of continuous wave signals have long been known and extensively used in the art. Typical of these instruments are the conventional wattmeter and power-measuring bridge which provide indications of average power. Such arrangements have very limited utility in connection with signals of pulse form because, for such signals, it is generally the peak, as distinguished from average, power that is to be determined. When an average-power meter is used in connection with pulse signals, the duty cycle (the relation of the pulse duration to the total signal time including the time separation of succeeding pulses) must be accurately known to convert from measured average power to the desired peak value. Obviously, the duty cycle may vary or may not be known with the precision required to convert from an average-power to a peak-power measurement. Furthermore, in certain pulse-modulated systems, the duty cycle may be such that the average power is too low for accurate measurement by power meters of the type under consideration.

It is an object of the present invention, therefore, to provide an electrical system for making measurements of recurring pulses of high frequency energy which avoids the aforementioned limitations of prior arrangements.

It is another object of the invention to provide an improved method for making a desired measurement of recurring pulses of high frequency energy.

It is a specific object of the invention to provide an improved method of and an electrical system for measuring the power of recurring pulses of high frequency energy.

In accordance with the present invention, an electrical system for making a predetermined measurement of recurring pulses of high frequency energy comprises means for supplying a high frequency signal having recurring interruptions that occur in approximate time coincidence with and have a duration at least equal to that of the pulses. The system also has means for combining the high frequency signal and the pulses to obtain a substantially continuous wave signal. Additionally, there are means for adjusting the amplitude of the high frequency signal to cause the continuous wave signal to have a substantially uniform amplitude-time characteristic and means are included in the system for making the aforesaid predetermined measurement on either one of the high frequency and continuous wave signals.

A method of making predetermined measurements of recurring pulses of high frequency energy, in accordance with the invention, comprises the steps of supplying a high frequency signal having recurring interruptions that occur in approximate time coincidence with and have a duration at least equal to that of the pulses and combining the high frequency signal and the pulses to obtain a substantially continuous wave signal. The method comprises the further steps of adjusting the amplitude of the high frequency signal to cause the continuous wave signal to have a substantially uniform amplitude-time characteristic and the making of desired measurement on either one of the high frequency or continuous wave signals.

For a better understanding of the present invention, together with other and further objects thereof, reference is had to the following description taken in connection with the accompanying drawing, and its scope will be pointed out in the appended claims.

In the drawing, Fig. 1 is a schematic representation of an electrical measuring system embodying the invention; Fig. 2 comprises a graph used in explaining the method of operation of the system shown in Fig. 1; Fig. 3 shows a modification of the arrangement of Fig. 1; while Fig. 4 is a schematic representation of another measuring system including the invention.

Referring now more particularly to Fig. 1, the system there represented is arranged to make predetermined measurements of recurring pulses of high frequency energy. It is especially suited for determining the peak power of pulse signals and will be discussed in that connection. The system includes a modulator 10 having one output circuit coupled to an oscillation generator 11 arranged for pulse-modulated operation and having a second output circuit coupled to another oscillation generator 12 intended for substantially continuous operation. As will be made clear hereinafter, generator 12 comprises means for supplying a high frequency signal having recurring interruptions that occur in approximate time coincidence with and have a duration at least equal to that of time-spaced pulses obtained from generator 11. The generator 12 includes an adjusting means, represented schematically at 24, for controlling the amplitude of the signal generated therein.

The system has means for combining or mixing the signal outputs of generators 11 and 12 to obtain a substantially continuous wave signal and for observing the amplitude of this signal. The mixer is in the form of a T-network provided by resistors 13, 14, and 15 having identical values and coupled to terminals 16, 17, and 18, respectively. Generator 11 is directly connected with terminal 16, generator 12 is connected to terminal 17 through a switch 19, and an oscilloscope or cathode-ray type line-tracing device 20 of conventional design is connected with the remaining terminal 18 through a high impedance or crystal detector 21. The system also has means for making power measurements of either the high frequency signal output of generator 12 or the continuous wave output of mixer 13—15. This means, in the embodiment under consideration, comprises a power-measuring bridge 22 connected with terminal 18 for measuring the power of the continuous wave signal available at that terminal. However, since the power measurement may be made from generator 12, a second bridge 22' has been illustrated in Fig. 1, connected to the output circuit of this generator by way of switch 19, although in a practical installation only one such bridge is usually employed. A timing impulse generator 23 has output circuits connected to an input circuit of modulator 10 and to a synchronizing control for the horizontal sweep circuit of oscilloscope 20 properly to time and co-ordinate the operation of the major components of the system.

Before considering the method of operating the described system for obtaining peak-power measurements of the pulse-modulated output of generator 11, it is desirable to consider the impedance relations which preferably are to be established at the mixer 13—15. Each of the resistors of the mixer preferably has a value selected to provide a matched impedance at each of the terminals 16, 17, and 18. For example, when the terminal impedance presented by each of units 11, 12, and 22 is equal to 50 ohms, resistors 13—15 individually have a value of 16.67 ohms. For these conditions, proper impedance matching is established between the mixer and the components connected thereto. Because of the fact that detector 21, connected in parallel with the bridge 22 has a high impedance, the match of the system is not materially disturbed by the circuit of the detector.

The operating frequency of oscillation generator 11 governs the frequency of the pulse-modulated output supplied to mixer terminal 16. In like manner, the operating frequency of generator 12 determines the frequency of the signal applied to mixer terminal 17. It is convenient, in practical operations of the system, to have the generators operate at the same frequency. This is particularly advantageous where any of units 13—15, 21, or 22 has a nonuniform frequency response. Where such units have a flat frequency response, the operating frequencies of generators 11 and 12 need not be the same, assuming, of course, that the terminal impedances of the generators do not vary appreciably over the frequency range involved.

In considering the operation of the measuring system of Fig. 1, assume switch 19 to be in the position shown. It will be understood that timing impulses from generator 23 are applied through modulator 10 to generators 11 and 12 to control these generators in opposite senses. More specifically, generator 11 which is normally maintained in an inoperative condition is keyed on by each output pulse of the modulator to generate a single pulse or burst of high frequency energy of specified time duration. Generator 12, however, is normally conditioned for continuous operation but is biased to a nonconductive state by each modulating pulse of modulator 10. Since substantially simultaneous modulating pulses from the modulator 10 control the generators 11 and 12, the pulses of high frequency energy from the former occur during intervals in which operation of the latter is interrupted. The interruption interval of generator 12 is approximately equal to, but preferably slightly greater than, the duration of the pulses supplied by generator 11 so that the pulses may easily fall within the voids of the signal output of generator 12. The mixer 13—15 combines these pulses with the interrupted continuous wave signal from generator 12, developing at the mixer terminal 18 a substantially continuous wave signal which is detected in detector 21 and applied to the vertical deflection electrodes of oscilloscope 20 in conventional manner.

The signal pattern traced by the oscilloscope for the initial adjustment of amplitude control 24 of generator 12 may be as indicated in Fig. 2. It includes two components: (1) the broken-line curve A—A and (2) the pulse component B. The component A—A designates the rectified signal output of generator 12 which is interrupted during the interval $t_1$ to $t_4$. In other words, the interruption during this interval $t_1$—$t_4$ represents a notch in the otherwise continuous wave output of generator 12. The rectified pulse output B of generator 11 is positioned within this notch and has a duration $t_2$ to $t_3$.

The amplitude control 24 of generator 12 is now adjusted to modify the scope pattern to that represented by the full-line construction. As thus modified, the indicated amplitude of the notched wave signal A'—A' is equal to the indicated peak amplitude of the pulse B and, therefore, the combined wave signal applied to the oscilloscope 20 from mixer terminal 18 has a substantially uniform amplitude-time characteristic indicating this to be a continuous wave signal. When this condition of adjustment has been established, the power-measuring bridge 22 is utilized to measure the average power of the signal output from mixer terminal 18. The average power is then equal to the peak-pulse power of the output of generator 11, as attenuated by mixer 13—15. By accounting for the loss or attenuation in the mixer, the peak-pulse power output of generator 11 may be accurately computed.

Certain inherent advantages of the described system become immediately apparent from the foregoing discussion. In the first place, it is clear from the representation of Fig. 2 that the location of the pulse B within the notched portion of the otherwise continuous wave output A'—A' of generator 12 facilitates a comparison of the peak amplitudes of these signals. By having the notch only slightly longer in duration than the pulse, this amplitude comparison may be made easily, quickly, and with great accuracy. Also, by having the pulse substantially fill the notch in this fashion, the output from mixer terminal 18 is, to all intents and purposes, a continuous wave signal as already indicated. For this reason, the power measurement of bridge 22 may also be exceedingly accurate. Hence, the system of Fig. 1 permits measurements of peak-pulse power to be made conveniently and with precision.

The notches in the signal output of generator 12 have been described and illustrated as having a slightly greater duration than the pulses to be measured. This may be accomplished by arranging modulator 10 to supply a longer modulating pulse to generator 12 than to generator 11. However, generators of conventional construction have a lag in responding to a modulating signal that is intended to change the operating condition of the generator from off to on. Consequently, even though identical modulating signals are simultaneously applied to generators 11 and 12 from modulator 10, the interruption period of generator 12 is usually a little longer than the duration of the pulses supplied by unit 11.

It will be appreciated that where the power of pulses having a short duration and a reasonably moderate repetition rate is being determined, switch 19 may be moved to its alternate position and bridge 22' used to measure the output power of generator 12 once the amplitude of its signal has been properly adjusted. In such a case fairly accurate results are obtained. Greater accuracy is obtainable by releasing generator 12 from the control of modulator 10 through another switch (not shown) when using bridge 22' to measure the power output of the generator. When using bridge 22' in the manner indicated, the measured power corresponds directly with the peak-power output of generator 11 since the measurement is here made immediately at the output circuit of generator 12, independently of mixer 13—15 and the attenuation incident thereto.

The timing pulse generator which controls not only the operation of the modulator 10 but also the horizontal sweep cycle of oscilloscope 20 causes the pattern represented in Fig. 2 to be stationary on the viewing screen of the oscilloscope. This further facilitates the making of observations as required to determine the pulse power in the manners described above.

The system of Fig. 3 is similar to that of Fig. 1 and corresponding components thereof are identified by the same reference characters. However, the mixer of Fig. 1 is replaced in Fig. 3 by a directional coupling device and a switch designated 30. The directional coupler is generally similar to that forming the subject of copending application Serial No. 670,081, filed May 16, 1946, in the name of Harold A. Wheeler, and assigned to the same assignee as the present invention. Briefly, the coupler has a first coaxial transmission line including an outer conductor 31 surrounding and shielding an inner conductor 32. It also has a second coaxial transmission line positioned to one side of line 31, 32 in parallel relation therewith. The second line comprises an inner conductor 33 and a surrounding shield 34. The shield portions 31 and 34 of the two lines have a part in common which is longitudinally slotted, as indicated at 35, to establish electric and magnetic coupling between the lines 31, 32 and 33, 34.

The first line 31, 32 is connected at one end with the output circuit of generator 11 and is selected to have a characteristic impedance of such value that this end of the line is terminated by the generator with a matched termination. The other end of this line may be selectively connected through a switch 40 to either the detector 21 or to the power-measuring bridge 22. It is preferred, however, that this end of the line be also terminated in its characteristic impedance, this being accomplished by appropriately adjusting the terminal impedances of the units 21 and 22.

One end of the alternate line 33, 34 is connected with the output circuit of oscillation generator 12 to be terminated thereby in its characteristic impedance. The opposite end of this line is terminated in its characteristic impedance, as represented schematically by a resistor 36. A more complete discussion of the constructional aspects of such a coupler is included in the above-identified copending application.

The modified system of Fig. 3 operates in substantially the same manner as that of Fig. 1. The directional coupler 30 has the advantage of isolating generators 11 and 12 from one another. Signal energy from generator 12, traversing line 33, 34 in the direction of its terminating resistor 36, develops a signal voltage at the terminal of line 31, 32 connected with switch 40 but develops substantially no voltage at the end of line 31, 32 terminated by generator 11. Conversely, in operating intervals during which signal pulses are supplied from generator 11, such pulses are translated directly through line 31, 32 to the switch 40. Furthermore, they establish a signal potential at the resistor 36 of the line 33, 34 but apply substantially no signal potential through the opposite end of this line to generator 12. This operation is completely explained in the aforementioned copending application.

With switch 40 connecting detector 21 and oscilloscope 20 a condition of adjustment is established as indicated by A'—A' and B in Fig. 2. Then with switch 40 connecting power-measuring bridge 22, the average power measured by bridge 22 is equal to the peak-pulse power of the output of generator 11, the power measurement desired.

In the measuring systems of Figs. 1 and 3, a control is exercised over the generation of the pulses to be measured. This control is supplied by the timing impulse generator 23. The system of Fig. 4 represents the application of the invention to the case where there may be no positive control over the generation of the pulses to be measured. For example, the system may include a source 45 of pulse-modulated signals of high frequency energy. By way of example, it may be a receiving antenna system or the like. One output terminal of the signal source 45 is coupled through a time-delay network 46 to a modulator 47 for controlling a continuous wave oscillation generator 48. The control knob and dial, indicated at 49, designate an amplitude-adjusting means for this generator. A T-type mixer, similar in construction to that of Fig. 1, is included in the system and has terminals 50 and 51 connected to the signal sources 45 and 48, respectively. Of course, the association of terminal 50 with the pulse source 45 is through time-delay network 46. A third output terminal 52 of the mixer is connected to an oscilloscope 53 through a detector 54 and to a power-measuring bridge 55. A synchronizing-signal generator 56 has an input circuit coupled to the pulse source 45 and an output circuit connected with the sweep synchronizing control of oscilloscope 53.

In the Fig. 4 arrangement, the pulse output of source 45 controls the operation of synchronizing-signal generator 56, thereby to impose a desired sweep cycle on the oscilloscope 53. The output of source 45 as applied to modulator 47 through delay network 46 keys off or interrupts the operation of the generator 48. Thus, it is seen that the arrangement comprises means responsive to the pulses of source 45—46 for generating a high frequency signal having recurring interruptions that occur in approximate time coincidence with and have a duration at least equal to that of the pulses as they appear after being delayed by the network 46. The function of the mixer in combining the signal outputs of sources 45 and 48 as well as the use and operation of units 53, 54, and 55 is substantially as described with reference to Fig. 1. The time-delay network 46 is introduced into the system so that the notch of the continuous wave output of generator 48 and the pulse from source 45 positioned within the notch may appear centrally of the viewing screen of the oscilloscope 53, as indicated in the patterns of Fig. 2.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrical system for making a predetermined measurement of recurring pulses of high frequency energy comprising, means for supplying a high frequency signal having recurring interruptions that occur in approximate time coincidence with and have a duration at least equal to that of said pulses, means for combining said high frequency signal and said pulses to obtain a substantially continuous wave signal, means for adjusting the amplitude of said high frequency signal to cause said continuous wave signal to have a substantially uniform amplitude-time characteristic, and means for making said predetermined measurement on one of said high frequency and continuous wave signals.

2. An electrical system for measuring the power of recurring pulses of high frequency energy comprising, means for supplying a high frequency signal having recurring interruptions that occur in approximate time coincidence with and have a duration at least equal to that of said pulses, means for combining said high frequency signal and said pulses to obtain a substantially continuous wave signal, means for adjusting the amplitude of said high frequency signal to cause said continuous wave signal to have a substantially uniform amplitude-time characteristic, and means for making a power measurement on one of said high frequency and continuous wave signals.

3. An electrical system for making a predetermined measurement of recurring pulses of high frequency energy comprising, means for supplying a high frequency signal having recurring interruptions that occur in approximate time coincidence with and have a duration at least equal to that of said pulses, means for combining said high frequency signal and said pulses to obtain a substantially continuous wave signal, means for adjusting the amplitude of said high frequency signal to cause said continuous wave signal to have a substantially uniform amplitude-time characteristic, and means for making said predetermined measurement on said continuous wave signal.

4. An electrical system for making a predetermined measurement of recurring pulses of high frequency energy comprising, means for supplying a high frequency signal having recurring interruptions that occur in approximate time coincidence with and have a duration approximately equal to that of said pulses, means for combining said high frequency signal and said pulses to obtain a substantially continuous wave signal, means for adjusting the amplitude of said high frequency signal to cause said continuous wave signal to have a substantially uniform amplitude-time characteristic, and means for making said predetermined measurement on one of said high frequency and continuous wave signals.

5. An electrical system for making a predetermined measurement of recurring pulses of high frequency energy comprising, means for supplying a signal of said high frequency having recurring interruptions that occur in approximate time coincidence with and have a duration at least equal to that of said pulses, means for combining said high frequency signal and said pulses to obtain a substantially continuous wave signal, means for adjusting the amplitude of said high frequency signal to cause said continuous wave signal to have a substantially uniform amplitude-time characteristic, and means for making said predetermined measurement on one of said high frequency and continuous wave signals.

6. An electrical system for making a predetermined measurement of recurring pulses of high frequency energy comprising, means for supplying a high frequency signal having recurring interruptions that occur in approximate time coincidence with and have a duration at least equal to that of said pulses, means for combining said high frequency signal and said pulses to obtain a substantially continuous wave signal, line-tracing means for tracing a line representative of the amplitude of said continuous wave signal, means for adjusting the amplitude of said high frequency signal to cause said continuous wave signal to have a substantially uniform amplitude-time characteristic, and means for making said predetermined measurement on one of said high frequency and continuous wave signals.

7. An electrical system for measuring the power of recurring pulses of high frequency energy comprising, means for supplying a high frequency signal having recurring interruptions that occur in approximate time coincidence with and have a duration at least equal to that of said pulses, means for combining said high frequency signal and said pulses to obtain a substantially continuous wave signal, line-tracing means for tracing a line representative of the amplitude of said continuous wave signal, means for adjusting the amplitude of said high frequency signal to cause said continuous wave signal to have a substantialy uniform amplitude-time characteristic, and a power-measuring device for measuring the power of said continuous wave signal.

8. An electrical system for making a predetermined measurement of recurring pulses of high frequency energy comprising, means responsive to said pulses for supplying a high frequency signal having recurring interruptions that occur in approximate time coincidence with and have a duration at least equal to that of said pulses, means for combining said high frequency signal and said pulses to obtain a substantialy continuous wave signal, means for adjusting the amplitude of said high frequency signal to cause said continuous wave signal to have a substantially uniform amplitude-time characteristic, and means for making said predetermined measurement on one of said high frequency and continuous wave signals.

9. The method of making a predetermined measurement of recurring pulses of high frequency energy which comprises the steps of supplying a high frequency signal having recurring interruptions that occur in approximate time coincidence with and have a duration at least equal to that of said pulses, combining said high frequency signal and said pulses to obtain a substantially continuous wave signal, adjusting the amplitude of said high frequency signal to cause said continuous wave signal to have a substantially uniform amplitude-time characteristic, and making said predetermined measurement on one of said high frequency and continuous wave signals.

10. The method of measuring the power of recurring pulses of high frequency energy which comprises the steps of supplying a high frequency signal having recurring interruptions that occur in approximate time coincidence with and have a duration at least equal to that of said pulses, combining said high frequency signal and said pulses to obtain a substantialy continuous wave signal, adjusting the amplitude of said high frequency signal to cause said continuous wave signal to have a substantially uniform amplitude-time characteristic, and measuring the power of one of said high frequency and continuous wave signals.

11. The method of measuring the power of recurring pulses of high frequency energy which comprises the steps of supplying a high frequency signal having recurring interruptions that occur in approximate time coincidence with and have a duration aproximately equal to that of said pulses, combining said high frequency signal and said pulses to obtain a substantially continuous wave signal, adjusting the amplitude of said high frequency signal to cause said continuous wave signal to have a substantially uniform amplitude-time characteristic, and measuring the power of said continuous wave signal.

CHARLES B. SHEPPARD.